Jan. 28, 1941.   H. D. BELLIN   2,230,175
MOTOR VEHICLE IDENTIFICATION
Filed Oct. 24, 1939   3 Sheets-Sheet 3

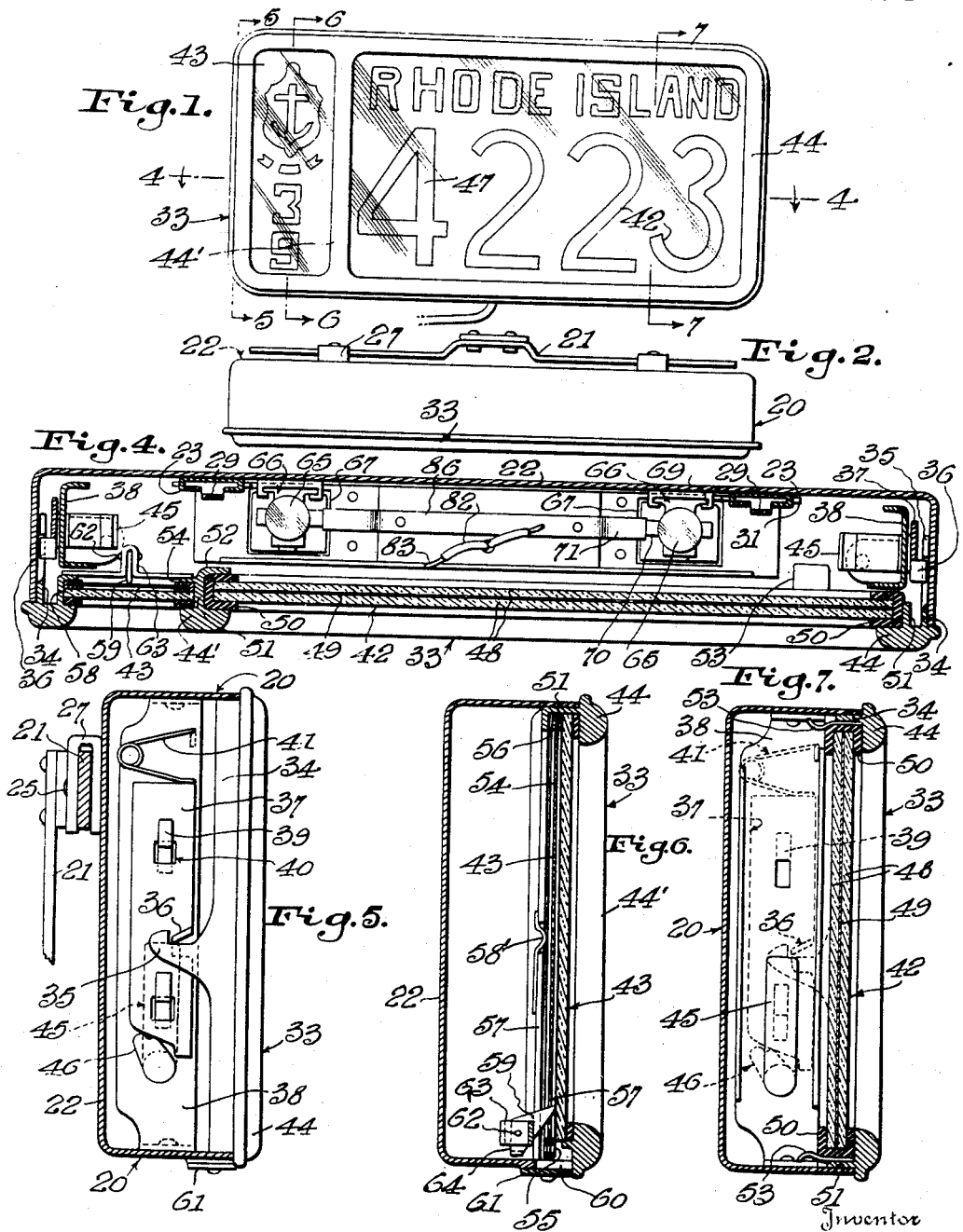
Jan. 28, 1941.  H. D. BELLIN  2,230,175
MOTOR VEHICLE IDENTIFICATION
Filed Oct. 24, 1939   3 Sheets-Sheet 1
Henry Davenport Bellin

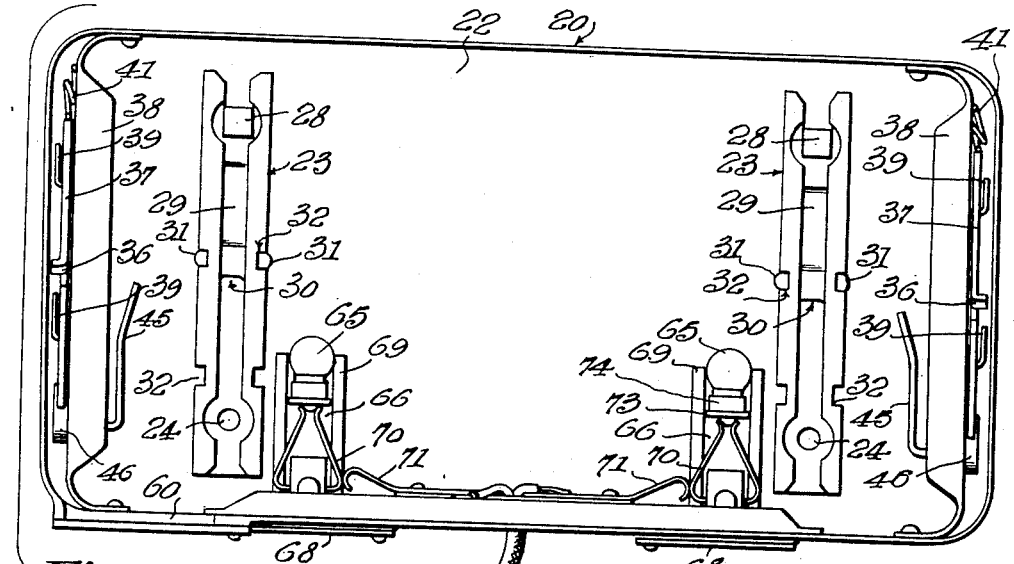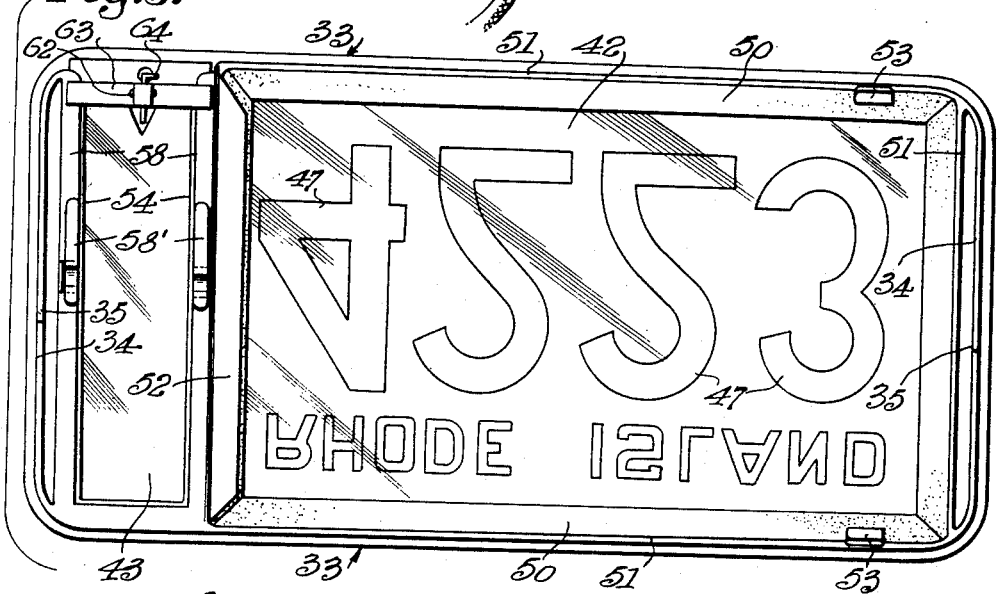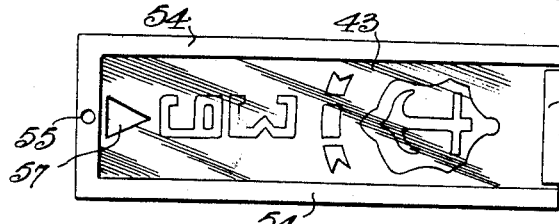

Inventor
Henry Davenport Bellin

Patented Jan. 28, 1941

2,230,175

UNITED STATES PATENT OFFICE 2,230,175

MOTOR VEHICLE IDENTIFICATION

Henry Davenport Bellin, Providence, R. I., assignor to Davenport Autoplate Patents Incorporated, Providence, R. I., a corporation of Rhode Island Application October 24, 1939, Serial No. 301,032

4 Claims. (Cl. 40—132)

The invention aims to provide a new and improved identification device for use on automobiles, trailers, motorcycles, etc., in place of the usual tags now customarily employed, said device being of such nature that it cannot be unlawfully detached for use on another machine without detection; cannot be unlawfully changed to display a different identification number or year number without detection; and will greatly lessen the theft of automobiles and the like, unauthorized use of machines and tags, etc.

In the present disclosure, a casing is provided to be attached to the car, preferably to the usual tag bracket; a cover is provided for said casing including an identification plate giving the number allotted to the machine, and a year plate having a number or numbers showing the period in which said machine number is valid; means are provided for securing the casing to the machine; means are provided for securing the cover to the casing; and means are provided for illuminating the identification means: and further objects are to provide a construction in which the casing securing means cannot be released without damaging the number plates or other portions of said cover to such an extent as to render the same unusable without detection; to provide securing means for said cover making it impossible to remove same for identification number change without so damaging the number plate or other part of the cover as to render same unfit for further use; and to provide a generally improved and effective device for safeguarding the motorist, truck operator and the like to the maximum against car theft, unauthorized car use, unauthorized tag use, etc.

With the foregoing in view, the invention resides in the novel subject matter hereinafter described and claimed, description being accomplished by reference to the accompanying drawings.

Figure 1 is a side elevation of an identification device constructed in accordance with the invention.

Figure 2 is an upper edge view.

Figure 3 is an elevation with the casing cover detached and swung downwardly.

Figure 4 is a horizontal sectional view on line 4—4 of Fig. 1.

Figures 5, 6 and 7 are transverse sectional views on lines 5—5, 6—6 and 7—7 of Figure 1.

Figure 8 is an elevation showing the year plate and its holding frame.

Figure 9:
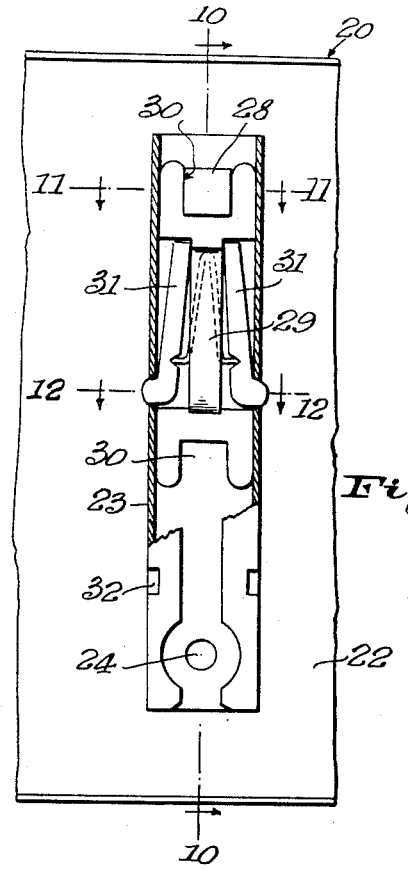

Figure 9 is a fragmentary vertical sectional view showing the means for locking the bolts which attach the casing to the car.

Figure 10:
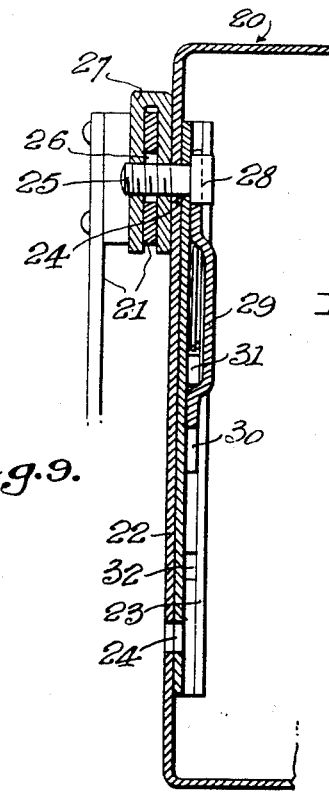

Figure 10 is a vertical section on line 10—10 of Fig. 9.

Figure 11:
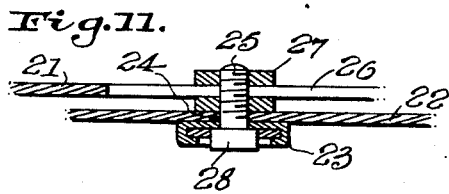
Figure 12:
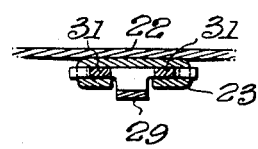

Figures 11 and 12 are horizontal sections on lines 11—11 and 12—12 of Fig. 9.

Figure 13:
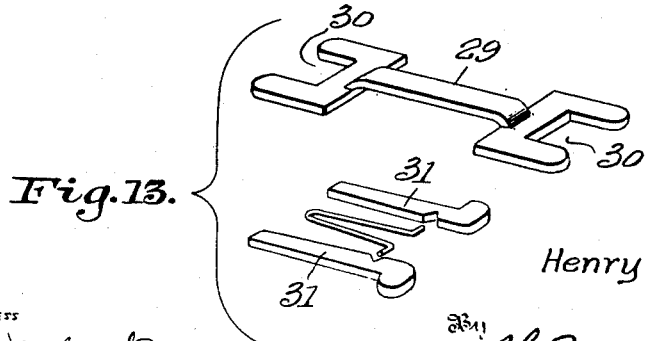

Figure 13 is a disassembled perspective view of the bolt-locking slide and the dogs which hold same in operative position.

A preferred construction has been illustrated and will be rather specifically described, with the understanding, however, that within the scope of the invention as claimed, numerous variations may be made. Further, while I will describe the invention as if intended only for use upon the rear of a machine, it is to be understood that the same device could be used to equal advantage at the front.

A shallow casing 20 is provided for attachment to a suitable bracket 21 or other appropriate part of a machine, said casing being preferably constructed of such material that it cannot be readily cut, sawed or bent. The rear side of the casing is open, to be closed by a novel cover hereinafter described. For the present disclosure, the front wall 22 of the casing is provided, at the interior of said casing, with two vertical channeled guides 23 which may be welded or otherwise secured thereto, and at the upper and lower ends of said guides, bolt holes 24 are shown to receive bolts 25 for attaching the casing to the bracket or the like 21. The bolts may be passed through either the uppermost or lowermost of the openings 24 as may be most convenient, said bolts pass through slots or other openings 26 in the bracket or the like 21, and in the present disclosure, said bolts are threaded through U-nuts 27 which so straddle a portion of the bracket or other part 21 that said nuts cannot be rotated and removed. It is necessary to rotate the bolts 25 in order to detach the casing 20, and the heads 28 of these bolts are normally so confined in the casing 20 that they are inaccessible without severely damaging some part of the device to such an extent as to render it no longer usable. Moreover, in the present showing, the heads 28 are locked both against accidental turning and against turning with some tool should anyone contrive to reach said heads, by means of slides 29 engaged with the channeled guides 23, said slides having notches 30 in their ends to engage the bolt heads 28 and hold said heads against rotation. Suitable spring-pressed dogs 31 have been shown mounted for movement with the slides 29 and engageable with openings 32 in the guides 23, to hold said slides in their operative positions. If the bolts 25 be passed through the uppermost of the bolt holes 24, the slides 29 are slid upwardly to engage said bolts, and if said bolts be passed through the lowermost of the openings 24, said slides are slid downwardly into engagement with said bolts. The openings 32 are so located that the dogs 31 may engage one set or another of said openings to lock the slides in engagement with the bolts. When access to the interior of the casing is had, for authorized removal of said casing, the projecting ends of the dogs 31 may be pressed inwardly and the slides 29 moved to released positions, permitting turning of the bolts 25 by engaging a wrench or the like with their heads 28. The specific manner of attaching the casing to the bracket, above described, is a divisible invention not claimed herein.

A detachable cover 33 is provided for the casing 20, said cover preferably having a flange 34 fitting within the open side of said casing. This flange is provided, at the ends of the cover 33, with two fixed hooks 35 which project into the casing and are engageable with inclined lugs 36 on vertically slidable latch bars 37 which are mounted in the end portions of said casing. In the present disclosure, special vertical bars 38 are rigidly mounted in the ends of the casing 20 to carry the latch bars 37, and said bars 38 may well be provided with tongues 39 passing through openings 40 in said latch bars 37, to slidably mount the latter. Suitable springs 41 have been shown for normally holding the latch bars 37 in their lowered operative positions but when the cover 33 is being forced closed, its hooks 35 engage the inclined lugs 36 and move the latch bars 37 upwardly until said springs 41 can snap said latch bars again to their lowered positions, in which positions they are solidly engaged with the hooks 35 to lock the cover 33 to the casing 20, and it will be observed that said latch bars cannot be released to permit removal of the cover 33, without so damaging some portion of said cover as to render it unfit for further use. It is of course intended that access shall be had to the interior of the casing only by breaking or otherwise seriously damaging an identification number plate 42 or a year number plate 43, rendering the entire device unfit for further use without detection, but if attempts should be made to pry or force the cover 33 from the casing without first releasing the latch bars 37, such action would result in so damaging the frame portion 44 of the cover that it could not be further used without detection.

In order to permit easy release of the latch bars 37 when the plates 42 and 43 have been gotten totally or partially out of the way by destruction, I have shown releasing levers 45 fulcrumed upon the bars 38 and having cams 46 engaging the lower ends of said bars 37, whereby a forward pull on the two levers 45 will slide said bars 37 upwardly and permit removal of the cover 33. Normally, with the cover in place, certain portions of this cover may well hold the levers 45 against movement in latch-releasing direction or against any appreciable movement in said direction.

The license plate 42 carrying the identification numbers 47, preferably consists of two pieces of safety glass (shatter-proof glass) 48 with a thin sheet 49 of pyroxylin or the like between them, the numbers 47 being preferably lithographed on said sheet 49. The plate or assemblage 42 preferably has its four edges snugly held in a channeled rubber strip 50 which abuts inwardly projecting flanges 51 on the cover frame 44. One of these flanges may well be provided with another flange 52 at right angles thereto, so that said one flange 51, said flange 52 and the adjacent portion 44' of the frame 44 (see Fig. 4) will form a channel or seat for the inner end of the plate 42. Two of the other flanges 51 which engage the longitudinal edges of the assemblage 42, may well be formed by portions of the flange 34 above described, and I prefer to provide them with spring fingers 53 to yieldably hold said assemblage in place. With the cover removed, the assemblage 42 may readily be pushed out of engagement with the fingers 53 and then pulled out from engagement with the flange 52, or more correctly speaking, any portion of said assemblage 42 which remains engaged with the rest of the cover after removing the latter, may thus be removed from the cover frame 44. A new assemblage may be inserted with equal ease.

The year plate 43 and the elements denoted by the reference numbers 54 to 64 relate to a divisible invention not claimed herein.

Illuminating bulbs 65 are shown for the year and identification number plates, and the elements 66 to 87 associated with said bulbs relate to a divisible invention not claimed herein.

From the foregoing, taken in connection with the accompanying drawings, it will be seen that novel and advantageous provision has been made for carrying out the objects of the invention, and while preferred features of construction have been illustrated, attention is again invited to the possibility of making numerous variations within the scope of the invention as claimed.

I claim:

1. An identification device comprising a casing having a front wall, a top, a bottom, end walls, and an open rear side; spring-applied latches mounted in the end portions of said casing, releasing handles for said latches disposed within said casing and movable outwardly beyond said open rear side thereof to effect latch release, and a cover for said open rear side engaging said top, bottom and end walls and including a license plate, said cover having rigid portions engaged by said latches, said cover having portions in the paths on which said releasing handles must be swung to effect latch release, whereby at least portions of said cover must be visibly damaged to gain access to said latch-releasing handles.

2. An identification device comprising a casing having a front wall, a top, a bottom, end walls, and an open rear side; spring-applied latches mounted in the end portions of said casing, releasing handles for said latches disposed within said casing and movable outwardly beyond said open rear side thereof to effect latch release, and a cover for said open rear side engaging said top, bottom, and end walls and having rigid portions engaged by said latches, said cover including a license plate whose ends are in the paths on which said handles must be moved to effect latch release, whereby access to said latch-releasing handles requires visible fragmentation of said ends of its license plate or other visible damage to said cover.

3. An identification device comprising a casing having a front wall, a top, a bottom, end walls, and an open rear side; vertical bars spaced inwardly from said end walls and secured at their ends to said casing top and bottom, spring-applied latches mounted on said vertical bars and disposed between the same and said end walls, releasing levers for said latches disposed within said casing and swingable outwardly beyond said open rear side thereof to effect latch release, and a cover for said open rear side engaging said top, bottom and end walls and including a license plate, said cover having rigid hooks extending between said end walls and said vertical bars and engaged by said latches, said cover being in the paths on which said releasing levers must be swung to effect latch release, whereby at least portions of said cover must be visibly damaged in order to gain access to said latch-releasing levers.

4. In an identification device having a casing, and a cover for said casing including an identification plate; a rigid hook on said cover extending into said casing, a latch bar slidably mounted in said casing and having a lug to engage said hook and lock the cover when said cover is closed, spring means for sliding said latch bar to its operative position, and a releasing lever for said latch bar mounted in said casing and operatively associated with said latch bar, said releasing lever being normally guarded by said cover and being accessible only when said cover is damaged to an unusable extent.

HENRY DAVENPORT BELLIN.